United States Patent [19]
Fukui et al.

[11] Patent Number: 5,193,408
[45] Date of Patent: Mar. 16, 1993

[54] ACTUATOR

[75] Inventors: Kiyozumi Fukui; Masami Okamoto; Toshio Kamimura, all of Gifu, Japan

[73] Assignee: Teijin Seiki Co., Ltd., Osaka, Japan

[21] Appl. No.: 876,296

[22] Filed: Apr. 30, 1992

Related U.S. Application Data

[63] Continuation of Ser. No. 508,897, Apr. 12, 1990, Pat. No. 5,129,273.

[30] Foreign Application Priority Data

Apr. 19, 1989 [JP] Japan ................................. 1-99257
Apr. 19, 1989 [JP] Japan ................................. 1-99258
Jun. 22, 1989 [JP] Japan ................................. 1-159914

[51] Int. Cl.$^5$ ............................................. F16H 1/18
[52] U.S. Cl. .............................. 74/89.15; 74/424.8 R
[58] Field of Search ......... 74/89.15, 424.8 R, 424.8 B

[56] References Cited

U.S. PATENT DOCUMENTS

| | | | |
|---|---|---|---|
| 3,530,734 | 9/1968 | Wray et al. | 74/424.8 |
| 4,827,789 | 5/1989 | Hallidy et al. | 74/424.8 B |
| 4,841,790 | 6/1989 | Williston et al. | 74/89.15 |
| 4,876,906 | 10/1989 | Jones | 74/89.15 |
| 4,903,535 | 2/1990 | Kikuta et al. | 74/89.1 |
| 4,953,418 | 9/1990 | Hirose | 74/424.8 A |

*Primary Examiner*—Richard E. Moore
*Attorney, Agent, or Firm*—Rothwell, Figg, Ernst & Kurz

[57] ABSTRACT

An actuator for transducing a rotational movement into a linear movement, which comprises:
a drive motor generating the rotational movement;
a first input gear connected to an output shaft of the drive motor;
a first output gear engaging with the first input gear at a first gear ratio and having an external thread portion;
a second output gear engaging with a second input gear at a second gear ratio and having an inner thread portion meshing with the external thread portion;
an output member connected to the second output gear and generating the linear movement; and
the first and second gear ratios being different from each other.

3 Claims, 3 Drawing Sheets

ACTUATOR

This is a continuation of application Ser. No. 07/508,897, filed Apr. 12, 1990, now U.S. Pat. No. 4,129,273, issued Jul. 14, 1990.

BACKGROUND OF THE INVENTION

The present invention relates to an actuator for transducing a rotational movement into a linear movement.

Actuators, wherein a rotational movement generated by an electric or fluid pressure motor is transduced into a linear movement by means of a ball screw and so on, have been conventionally known.

However, in such conventionally known actuators, transmission gear ratios cannot be changed in accordance with the external load by a simple mechanism.

Accordingly, it has been required to develop an actuator wherein transmission gear ratio can be changed by a simple mechanism in accordance with the external load.

Further, the reducing gear ratios in such conventionally known actuators are small, and accordingly, the amount of linear movement per one revolution of the motor is large. Therefore, a large motor has to be used so as to obtain a desired output force.

Accordingly, in the conventionally known actuators, there are problems that a large space is required for installing such a large motor, that the actuator is heavy because of such a large motor and that the cost of the actuator is expensive since such a large motor is expensive.

In order to overcome the above-mentioned problems, an attempt, wherein the rotation of the motor is reduced by a gear train or an epicycle reduction gear disposed on an output shaft of the motor, has been done so that the reduction gear ratio is made large, i.e., so that the amount of linear movement per one revolution of the motor is made small.

Further, according to the conventional actuators, in order to enhance the reduction gear ratio at the rotational stage, it is necessary to prepare a set of gear trains wherein the diameters of the gears are largely different or to dispose various stages of gear trains. Accordingly, a large space is still necessary, and the weight of the actuator is increased. In addition, there occurs a problem that the construction is complicated when an epicycle reduction gear is used.

SUMMARY OF THE INVENTION

It is an object of the present invention to provide an actuator by which the problems inherent to the conventionally known actuators can be overcome.

It is another object of the present invention to provide an actuator for transducing a rotational movement into a linear movement which is compact and light and by which a large reducing gear ratio can be achieved.

It is a still other object of the present invention to provide an actuator for transducing a rotational movement into a linear movement by which transmission gear ratios can be changed by a simple mechanism.

According to the first aspect of the present invention, the above-described objects are achieved by an actuator for transducing a rotational movement into a linear movement, which comprises:
a drive motor generating the rotational movement;
a first output gear driven by the drive motor at a first gear ratio;
a second output gear driven by the drive motor at a second gear ratio:
the first and second gear ratios being different from each other: and
an output member generating the linear movement in response to angular difference between the first and second gears.

According to this aspect of the present invention, a differential mechanism, which reduces the rotational movement of the drive means and which transmits it to the transducing means, is disposed between the drive means and the transducing means, and accordingly, the actuator can be compact and can achieve a large reducing gear ratio.

According to the first embodiment of the present invention, the differential mechanism comprises:
a first output gear engaging with the first input gear at a first gear ratio and having an external thread portion:
a second output gear engaging with a second input gear at a second gear ratio and having an inner thread portion meshing with the external thread portion; and
the first and second gear ratios being different from each other.

This embodiment is preferred since the actuator of the first embodiment can be compact and can achieve a large reducing gear ratio.

According to the second embodiment of the present invention, the differential mechanism comprises:
a first output gear engaging with the first input gear at a first gear ratio and having an external thread portion;
a second output gear engaging with the second input gear at a second gear ratio and having a hollow portion;
the first and second gear ratios being different from each other: and
a summing block having an inner thread portion meshing with the external thread portion of the first output gear and axially movably disposed within the hollow portion of the input gear.

This embodiment is preferred since the transmission efficiency between the second output gear and the summing block can be enhanced.

According to another aspect of the present invention, an actuator for transducing a rotational movement into a linear movement is provided, which comprises:
a drive means generating the rotational movement;
a transducing means transducing the rotational movement into the linear movement;
an output means outputting the transduced linear movement; and
a reducing means disposed between the drive means and the transducing means and reducing the rotational movement and transmitting it to the transducing means; and
a control means controlling connection between the drive means and the reducing means.

In the thus obtained actuators, transmission gear ratios can be easily changed by controlling the connection between the drive means and the reducing means by means of the control means.

Further, in this aspect of the present invention, a differential mechanism, which reduces the rotational movement of the drive means and which transmits it to the transducing means, is disposed as the reducing means between the drive means and the reducing means.

As illustrated in the third embodiment, which will be explained later, the present invention of this aspect is preferably constructed as an actuator for transducing a rotational movement into a linear movement, which comprises:

a drive motor generating the rotational movement;
an input gear shaft connected to an output shaft of the drive motor;
a first input gear shaft inserted onto the input shaft and a second input gear connected to the input gear shaft;
a clutch means controlling connection between the first input gear and the input gear shaft;
a first output gear engaging with the first input gear at a first gear ratio and having an external thread portion;
a second output gear engaging with the second input gear at a second gear ratio and having an inner thread portion meshing with the external thread portion;
an output member connected to the second output gear and generating the linear movement; and
the first and second gear ratios being different from each other.

The thus obtained actuator is preferred because it can be compact and can achieve a large reducing gear ratio.

BRIEF DESCRIPTION OF THE DRAWINGS

The present invention will now be explained in detail with reference to the accompanying drawings which show some embodiments of the present invention and wherein.

PREFERRED EMBODIMENTS

Some embodiments of the present invention, which are carried out in the electric-mechanical actuators (EMA) of a control surface of an aircraft, will now be explained in detail.

Figure 1:
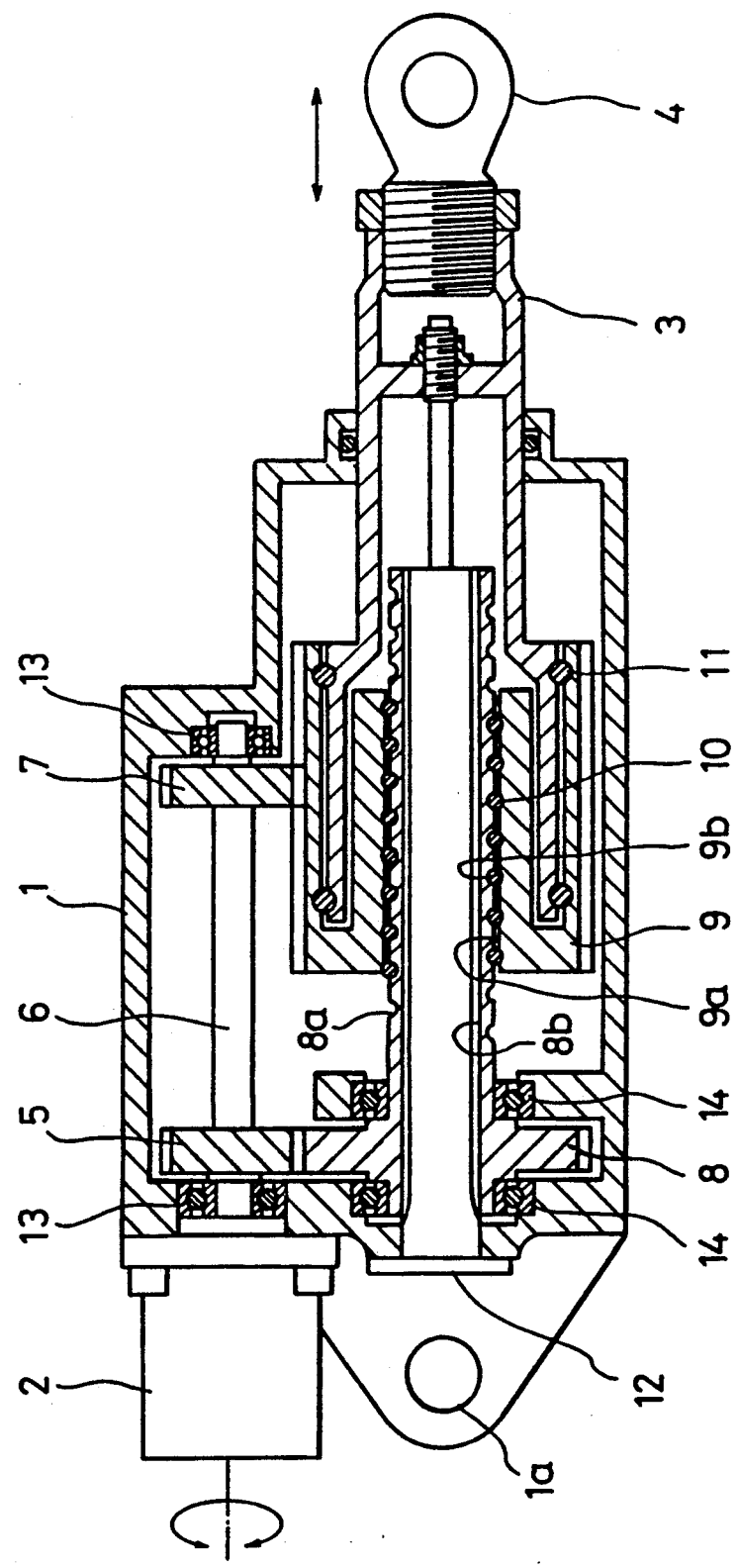
FIGS. 1 to 3 are cross sectional views of the different embodiments of actuators of the present invention, which embodiments are carried out as the electric-mechanical actuators of control surface of an aircraft.

FIG. 1 shows a first embodiment of the present invention. A housing 1, an end 1a of which is connected to an air frame (not shown), has an electric motor 2, such as a servo motor or a stepping motor, mounted thereon, and both ends of an output shaft 6 of the motor 2 are rotatably supported on the housing 1 by a pair of bearings 13.

The output shaft 6 has a first input gear 5 and a second input gear 7 integrally formed therewith or disposed thereon.

According to this embodiment, the first and second input gears 5 and 7 have the same diameters and the same numbers of teeth.

A first output gear 8, which engages with the first input gear 5, is rotatably supported on the housing 1 via bearings 14.

The second input gear 7 engages with a second output gear 9.

The front end (the right end in FIG. 1) of the first output gear 8 projects like an hollow cylinder which has a ball screw 8a (an external thread) formed on the outer periphery thereof. A second output gear 9 has a hollow cavity 9a, which has a ball screw 9b (an inner thread) formed on the inner surface thereof. The ball screws 8a and 9b mesh with each other via balls 10.

The second output gear 9 is formed in a long gear extending in an axial direction so that it can move in an axial direction of the ball screws 8a and 9b, and the second output gear 9 rotatably supports a piston 3 via bearings 11 though it does not allow the piston 3 any movement in an axial direction relative to the second output gear 9. A rod end 4 is integrally connected to the piston 3 and constitutes an output end. The rotation of the piston 3 is prevented by connecting the rod end 4 to a final controlling element, such as a control surface of an aircraft, which has to be moved linearly.

A detector 12 of the position of the piston 3 is disposed in the housing 1 so that it locates within an elongated hole 8b formed in the first output gear 8. The positional detector 12 of this embodiment is a linear variable-differential transformer (LVDT).

The numbers of teeth of the first and second output gears 8 and 9 are slightly different, for example, the difference is one. Either one of them may be larger than the other. However, the moving direction of the piston 3 relative to the rotational direction of the motor 2 may be altered in accordance with the fact which number is larger than the other.

It is assumed that the numbers of both the first and second input gears 5 and 7 are 12, that the number of the first output gear 8 is 48, and that the number of the second output gear 9 is 49. When the motor 2 is rotated four revolutions, together with the first and second input gears 5 and 7, the first output gear 8 rotates one revolution, while the second output gear 9 rotates 48/49 revolutions, and thus, the ball screws 8a and 9b connected to the first and second output gears 8 and 9 relatively rotates by the difference in revolutions, i.e., 1/49 revolutions. As a result, the second output gear 9 axially moves by a distance, which is equal to lead length × 1/49, together with the piston 3.

More specifically, when the motor 2 rotates 4×49=196 revolutions, the piston 3 moves by one lead of the ball screws 8a and 9b. The position of the piston 3 is fed back to the motor 2 by means of the positional detector 12.

As described above, the rotation of the motor 2 is reduced by the differential mechanism and then is transduced into the linear movement by the ball screws 8a and 9b.

Figure 2:
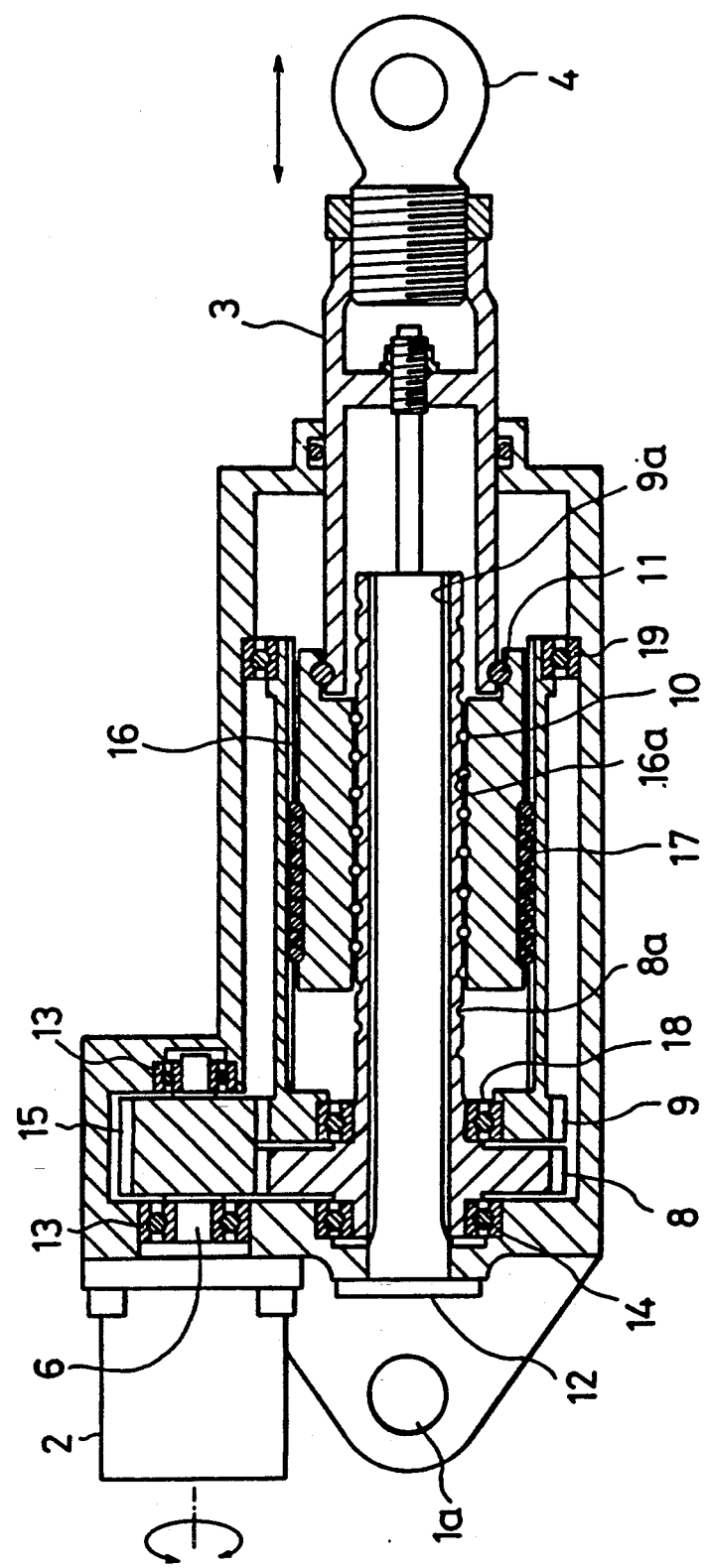

A second embodiment of the present invention will now be explained with reference to FIG. 2. Similar to the first embodiment, a housing 1, an end 1a of which is connected to an air frame (not shown), has an electric motor 2, such as a servo motor or a stepping motor, mounted thereon, and both ends of output shaft 6 of the motor 2 are rotatably supported on the housing 1 by a pair of bearings 13.

The output shaft 6 has an input gear 15 integrally formed therewith or disposed thereon. In this embodiment, the thickness of the input gear 15 is made large, and a single gear is used, however, the gear may be divided into two gears, i.e., first and second gears.

A first output gear 8 which engages with the input gear 15 is rotatably supported on the housing 1 via bearings 14. Further, the input gear 15 also engages with a second output gear 9. The second output gear 9 is rotatably supported by bearings 18 and 19.

The front end (the right end in FIG. 2) of the first output gear 8 projects like an hollow cylinder which has a ball screw 8a (an external thread) formed on the outer periphery thereof. A second output gear 9 has a hollow cavity 9a.

A summing block 16 formed in a cylindrical shape is rotatably disposed within the hollow cavity 9a via ball spline 17 so that it can move in an axial direction of the second output gear 9 though it is not allowed to be relatively rotated relative to the second output gear 9.

A summing block 16 has a ball screw 16a (an inner thread) formed on the inner surface thereof. The first output gear 8 and the ball screws 8a and 16a mesh with each other via balls 10.

The front end portion of the summing block 16 rotatably supports the piston 3 via a bearing 11 in such a manner that it does not allow the piston 3 to move axially relative to the summing block 16.

Similar to the first embodiment, a rod end 4 is integrally connected to the piston 3 and constitutes an output end. The rotation of the piston 3 is prevented by connecting the rod end 4 to a final controlling element, such as a control surface of an aircraft, which has to be moved linearly.

A detector 12 of the position of the piston 3 is a linear variable-differential transformer (LVDT) similarly to the first embodiment and is disposed in the housing 1 so that it locates within an elongated hole 8b formed in the first output gear 8.

Similar to the first embodiment, the numbers of teeth of the first and second output gears 8 and 9 are slightly different, for example, the difference is one. Although either one of them may be large, the moving direction of the piston 3 relative to the rotational direction of the motor 2 may be altered depending on the fact which number is larger than the other. The operation of the differential mechanism is similar to that of the differential mechanism installed in the first embodiment.

Thus, the rotation of the motor 2 is reduced by the differential mechanism, which comprises the first and second gears 8 and 9 and the summing block 16, and then is transduced into the linear movement by the ball screws 8a and 16a.

In the first embodiment, the second input gear and the second output gear engage with each other and they move in an axial direction relative to each other while they transmit their rotations therebetween.

Contrary to this, in the second embodiment, there is disposed the summing block 16, which has the inner thread portion 16a engaging with the external thread portion 8a of the first output gear 8, and the summing block 16 is connected to the second output gear 9 via a mechanism such as the ball spline 17, which moves relatively in an axial direction while it transmits the rotation during its rolling contact.

As a result, the transmission efficiency of the second embodiment is not decreased in case that the transmission efficiency of the first embodiment is decreased.

The above-described explanations have been done with reference to the actuators installed in aircrafts. However, the present invention can be applied not only to actuators used in aircrafts but also to actuators by which a rotational movement is transduced into a linear movement and which are widely used in various industrial fields.

According to the present invention, an actuator for transducing a rotational movement into a linear movement is provided which is compact and light and by which a large reducing gear ratio can be achieved.

Figure 3:
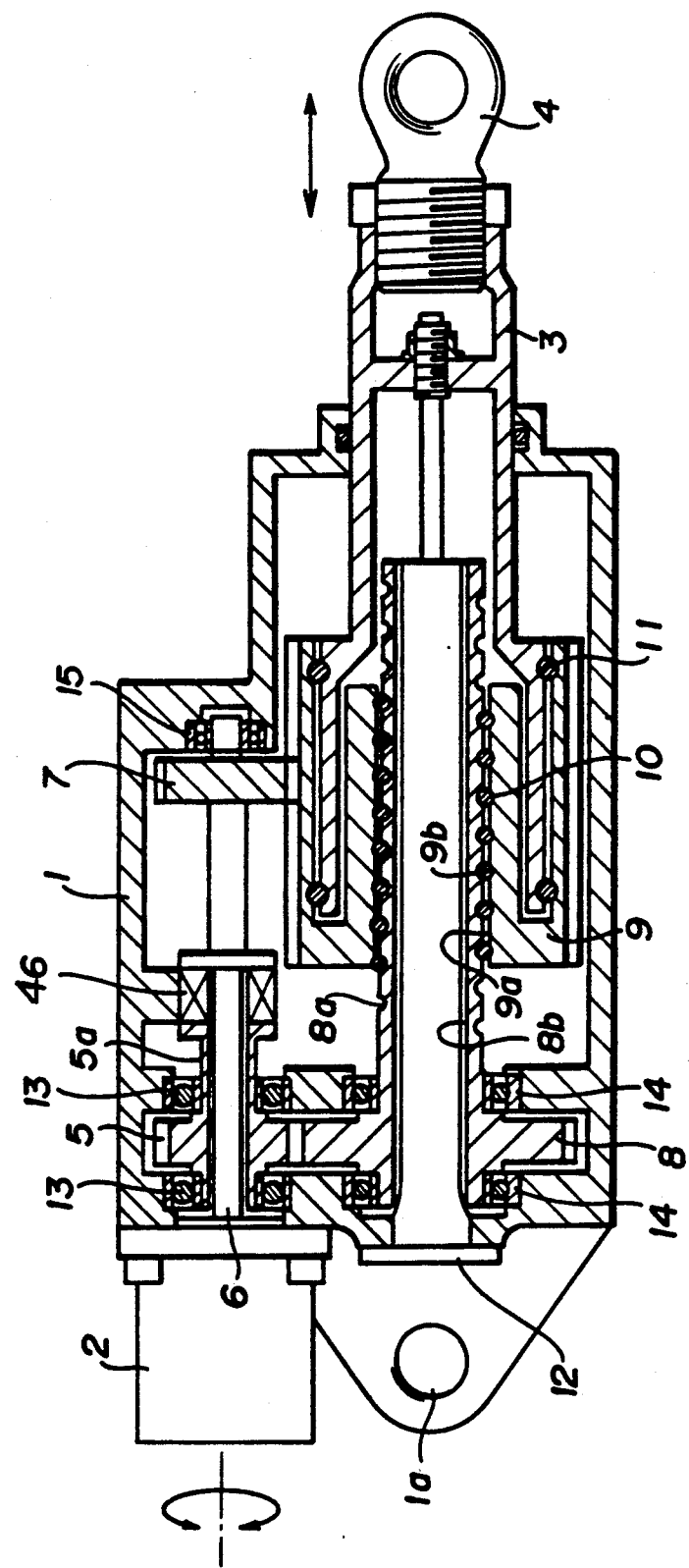

FIG. 3 shows a third embodiment of the present invention. A housing 1 has an end 1a connected to an air frame (not shown) and has an electric motor 2, such as a servo motor or a stepping motor, mounted thereon. An end of an output shaft 6 of the motor 2 is rotatably supported on the housing 1 by a bearing 15.

A first input gear 5 has cylindrical portions 5a projecting therefrom and is loosely inserted onto the output shaft 6. The first input gear 5 is rotatably supported on the housing 1 at the cylindrical portions 5a. A clutch brake 46 of an electro-magnetic type is disposed in the housing 1 in such a manner that it faces the outer periphery of the cylindrical portion 5a of the first output gear 5.

The clutch brake 46 electro-magnetically connects the output shaft 6 to the first input gear 5 or electro-magnetically disconnects the former from the latter in accordance with an externally transmitted electric signal. Further, the first input gear 5 is electro-magnetically connected to the housing by the clutch brake 46 when the clutch brake 46 disconnects the output shaft 6 from the first input gear 5 so that the rotation of the first input gear 5 is stopped.

The output shaft 6 has a second input gear 7 integrally formed therewith or disposed thereon at the right end thereof.

According to this embodiment, the first and second input gears 5 and 7 have the same diameters and the same numbers of teeth.

A first output gear 8 engages with the first input gear 5 and is rotatably supported on the housing 1 via bearings 14. Further, the second input gear 7 engages with a second output gear 9.

The front end (the right end in FIG. 1) of the first output gear 8 projects like an hollow cylinder which has a ball screw 8a (an external thread) formed on the outer periphery thereof.

A second output gear 9 has a hollow cavity 9a, which has a ball screw 9b (an inner thread) formed on the inner surface thereof. The ball screws 8a and 9b mesh with each other sandwiching balls 10 therebetween.

The second output gear 9 is formed in a long gear extending in an axial direction so that it can move in an axial direction of the ball screws 8a and 9b. The second output gear 9 rotatably supports a piston 3 via bearings 3 though it does not allow the piston 3 any movement in an axial direction relative to the second output gear 9.

A rod end 4 is integrally connected to the piston 3 and constitutes an output end. The rotation of the piston 3 is prevented by connection of the rod end 4 to a final controlling element, such as a control surface of an aircraft, which has to be moved linearly.

A positional detector 12 of the piston 3 is disposed in the housing 1 so that it locates within an elongated hole 8b formed in the first output gear 8. The positional detector 12 of this embodiment is a linear variable-differential transformer (LVDT).

The numbers of teeth of the first and second output gears 8 and 9 are slightly different, for example, the difference is one, either one of them may be larger than the other, however, the moving direction of the piston 3 relative to the rotational direction of the motor 2 may be altered depending on which number is larger.

It is assumed that the numbers of both the first and second input gears 5 and 7 are 12, that the number of the first output gear 8 is 48, and that the number of the second output gear 9 is 49.

When the clutch of the clutch brake 46 is "off" due to the external signal, the input shaft 6 and the first input gear are disconnected from each other, and the first input gear 5 is secured to the housing 1 by means of the brake of the clutch brake 46. As a result, the rotation of the motor 2 is transmitted to the second input gear 7 and the second output gear 9, and it rotates the ball screw 9b.

Contrary to this, due to the securing of the first input gear 5, both the first output gear 8 and the ball screw 8a are also secured, and accordingly, the rotation of the second output gear 9 generates axial displacement of the ball screw 9b. Thus, the piston 3 is linearly moved via the bearing 11.

The transmission gear ratio becomes 12/49 when the first input gear 6 is disconnected by the clutch brake 46.

In the meantime, when the clutch of the clutch brake 46 is "on" so that the input shaft 6 and the first input gear 5 are connected to each other, operation is as follows.

When the motor 2 is rotated four revolutions, together with the first and second input gears 5 and 7, the first output gear 8 rotates one revolution, while the second output gear 9 rotates 48/49 revolutions, and thus, the ball screws 8a and 9b connected to the first and second output gears 8 and 9, respectively, rotates relatively by the difference in revolutions, i.e., 1/49 revolutions. As a result, the second output gear 9 axially moves by a distance, which is equal to lead length×1/49, together with the piston 3.

More specifically, when the motor 2 rotates 4×49=196 revolutions, the piston 3 moves by one lead of the ball screws 8a and 9b. The position of the piston 3 is fed back to the motor 2 by means of the positional detector 12.

Thus, the rotation of the motor 2 is reduced by the differential mechanism and then is transduced into the linear movement by the ball screws 8a and 9b.

As described above, according to the present embodiment, in accordance with the conditions of the clutch brake 46, two types of transmission gear ratios can be obtained, i.e., differential transmission gear ratio=1/196 when the clutch is "on", and one stage transmission gear ratio=12/49 when the clutch is "off".

The ratios can be freely set by altering the numbers of the teeth of the first input gear 5, the second input gear 7, the first input gear 8 and the second output gear 9.

The above-described explanation has been done with reference to an actuator installed in an aircraft. However, the present invention can be applied not only to actuators used in aircrafts but also to actuators by which a rotational movement is transduced into a linear movement and which are widely used in various industrial fields.

Further, although a differential mechanism including ball type external and internal threads is exemplified as a reducing means, the reducing means of the present invention is not limited to the exemplified type.

According to the present invention, an actuator for transducing a rotational movement into a linear movement is provided, which is compact, light and inexpensive and by which transmission gear ratios can be changed by a simple mechanism.

What we claim is:

1. An actuator for transducing a rotational movement into a linear movement, which comprises:
    a drive means generating said rotational movement;
    a transducing means transducing said rotational movement into said linear movement;
    an output means outputting said transduced linear movement; and
    a reducing means disposed between said drive means and said transducing means and reducing said rotational movement and transmitting it to said transducing means wherein said reducing means comprises a first input gear and said drive means generates rotational movement through a second input gear; and
    a control means controlling connection between said drive means and said reducing means.

2. An actuator for transducing a rotational movement into a linear movement, which comprises:
    a drive motor generating said rotational movement;
    an input gear shaft connected to an output shaft of said drive motor;
    a first input gear inserted onto and connected onto said input gear shaft and a second input gear connected to said input gear shaft;
    a clutch means controlling the connection between said first input gear and said input gear shaft;
    a first input gear engaging with said first input gear at a first gear ratio and having an external thread portion;
    a second output gear engaging with said second input gear at a second gear ratio and having an inner thread portion meshing with said external thread portion;
    an output member connected to said second output gear and generating said linear movement; and
    said first and second gear ratios being different from each other.

3. An actuator as claimed in claim 1 wherein said first and second input gears are disposed on the drive means.

* * * * *

UNITED STATES PATENT AND TRADEMARK OFFICE
CERTIFICATE OF CORRECTION

PATENT NO. : 5,193,408
DATED : March 16, 1993
INVENTOR(S) : Kiyozumi FUKUI

It is certified that error appears in the above-identified patent and that said Letters Patent is hereby corrected as shown below:

On the title page, in the Abstract, line 13:
"movenment;" should be --movement;--.

Signed and Sealed this

Eleventh Day of January, 1994

Attest:

BRUCE LEHMAN

Attesting Officer    Commissioner of Patents and Trademarks